United States Patent [19]
Okazaki

[11] Patent Number: 4,592,630
[45] Date of Patent: Jun. 3, 1986

[54] OPHTHALMIC LENSES

[75] Inventor: Sakiho Okazaki, Suwa, Japan

[73] Assignee: Seiko Epson Corporation, Tokyo, Japan

[21] Appl. No.: 702,859

[22] Filed: Feb. 20, 1985

Related U.S. Application Data
[63] Continuation of Ser. No. 180,765, Aug. 25, 1980, abandoned.

[30] Foreign Application Priority Data
Aug. 24, 1979 [JP] Japan .................. 54-107966

[51] Int. Cl.⁴ ........................... G02C 7/06
[52] U.S. Cl. ............................. 351/169
[58] Field of Search .................. 351/168–172

[56] References Cited

U.S. PATENT DOCUMENTS
4,315,673 2/1982 Guilino et al. .................. 351/169

Primary Examiner—John K. Corbin
Assistant Examiner—Scott J. Sugarman
Attorney, Agent, or Firm—Blum Kaplan Friedman Silberman & Beran

[57] ABSTRACT

An ophthalmic lens having a far vision viewing zone in the upper region of the lens, a near vision viewing zone in the lower region of the lens, an intermediate vision viewing zone in the region intermediate the far vision zone and the near vision zone and a principal meridian vertically disposed in the center of the lens is provided. The far vision viewing zone is divided horizontally into three regions wherein astigmatism is at least in the central region and increases in the regions on both sides of the center region. The central region is formed so that the principal meridian substantially bisects the central region of the far vision viewing zone.

10 Claims, 8 Drawing Figures

OPHTHALMIC LENSES

This is a continuation of application Ser. No. 180,765, filed on Aug. 25, 1980, now abandoned.

BACKGROUND OF THE INVENTION

This invention relates generally to ophthalmic lenses, and particularly to ophthalmic lenses having a progressively varying focal power wherein the wearer, whose crystalline lens looses its power of accommodation can comfortably view far and near objects.

Many references teach conventional progressive power lenses. Two such publications are Japanese Patent Publication No. 49-3595 corresponding to U.S. Pat. No. 3,687,528 to Maitenaz and Japanese Laid-Open Patent No. 50-46348, corresponding to U.S. Pat. Nos. 4,055,379, 4,056,311 and 4,062,629 to Winthrop. The lenses disclosed in these publications include a far vision viewing zone (hereinafter referred to as a far zone), an intermediate vision zone (hereinafter referred to as an intermediate zone) and a near vision viewing zone (hereinafter referred to as a near zone). Each of these references is based upon the well-known technique to provide the lenses with an umbilical principal meridian wherein the value of curvature is gradually changed by adding a predetermined power addition. Each of these references includes specific features of construction as hereinafter described.

The lenses in accordance with Japanese Patent Publication 49-3595 are based on the design wherein the aberration which is inevitably caused in progressive power lenses should be distributed uniformly across the entire surface of the lens. This reduces distortion of the image and reduces shaking of the image caused when the wearer moves within the visual field. The distortion causes a swimming or rocking effect when the wearer's head is moved giving a sensation of shaking. The line of intersection between a plane orthogonal to the principal meridian and the refractive surface is circular only at its center point. In the upper region therefrom, the curvature radius on the line of intersection is reduced as it becomes more distant from the principal meridian. In the lower regions, it is increased as it becomes more distant from the principal meridian. Both the line of intersection in the upper and lower regions are non-circular curves. Thus, all but one region is non-circular. Accordingly, it goes without saying that the clear viewing zone (in the range where astigmatism is 0.5 diopters or less), is narrow in the near zone. Furthermore, it is also very narrow in the far zone. Since a wearer desires to look out over a broad range when viewing a distant object, such a narrow zone is indeed inconvenient.

The disclosure in Japanese Laid-Open Specification No. 50-46348 is that the clear viewing zone in the far zone and near zone should include a large area with abberation concentrated in the periphery of the clear viewing zone in a long and narrow strip form so as to provide relatively good viewing in the region outside the abberation region. For example, the intermediate zone is divided laterally into five regions and the central region is a region where abberation is small and the clear viewing zone is enlarged. In the two outside regions, the skew distortion is reduced to zero. The two regions sandwiched between the center region and the respective two outside regions are boundary regions. Consequently, abberation is concentrated in these boundary regions and the astigmatism becomes very large with the image being much distorted. For example, a horizontal line in its central portion becomes an inverted U-shaped ($\eta$) with the line horizontal in its outside-most region. In other words, the line is suddenly curved in the boundary regions.

The lens surface in the near zone and intermediate zone is a circular surface and the entire surface of the far zone is a spherical surface. Therefore, the clear viewing zones of the far (vision viewing) zone and of the near (vision viewing) zone are extremely large when compared with the lenses constructed in accordance with Japanese Patent Publication No. 49-3595. Because of the large clear viewing zone and reduction of skew distortion of the outside-most regions, abberation is concentrated most in the boundary regions. When these lenses are worn, the shaking or rocking effect is strongly observed which is uncomfortable for the wearer. Thus, despite the positive point by providing a lens with a broad clear view zone for far and near vision, this lens causes a wearer the uneasy feeling due to the shaking effect when worn.

These above-described lenses are suitable for some special uses which suit the particular features of the lenses. For example, these lenses may be used for certain types of sports, reading, note-taking and the like. However, these lenses are not totally satisfactory for the reasons noted above. Most significantly, the wearer is dissatisfied when the lenses are worn for general use, even including the above-mentioned work and sports activities. Accordingly, it would be desirable to provide an ophthalmic lens having a progressively variable focal power which overcomes the above-mentioned shortcomings of the conventional progressive power lenses. Specifically, this would include a clear viewing zone having an area which is convenient for daily use in each of the far, intermediate and near (vision viewing) zones with a concentration of abberation reduced in the peripherial regions.

SUMMARY OF THE INVENTION

Generally speaking, in accordance with the invention, an ophthalmic lens having a progressively variable focal power having a region of clear viewing which is convenient for daily use in each of the far, intermediate and near (vision viewing) zones with a concentration of abberation reduced in the peripheral portion is provided. The ophthalmic lenses in accordance with the invention include a far vision viewing zone F in the upper region of the lens, a near vision viewing zone N in the lower region of the lens and an intermediate vision viewing zone P disposed between the upper far zone F and the lower near zone N. The ophthalmic lenses are formed with a principal meridian MM' substantially in the center of the lens in the vertical direction. The far vision viewing zone F is divided horizontally into three regions where the astigmatism is the least in the central region $F_1$ and increases in the outer region $F_2$ and $F_3$ on both sides of the center region $F_1$. The center region $F_1$ is disposed so that the principal meridian MM' is substantially in the center.

In the ophthalmic lenses designed in accordance with the invention, the width of the center area $F_1$ of the far vision viewing zone F is at least 30 mm. Additionally, the skew distortion $\partial^2 f / \partial x \partial y$ in the outer regions of the intermediate vision viewing zone P falls within range of from about 0.0003 to 0.0020 in the range of from one to three diopter power addition.

Accordingly, it is an object of the invention to provide an improved ophthalmic lens.

Another object of the invention is to provide an improved ophthalmic lens having a progressively variable focal power.

A further object of the invention is to provide an ophthalmic lens having a far vision viewing zone, a near vision viewing zone and an intermediate vision viewing zone with a principal meridian in the center of the lens in a vertical direction.

Still another object of the invention is to provide a wearer with reduced power of accommodation with lenses which are comfortable for far and near successive viewing.

Still a further object of the invention is to provide an improved ophthalmic lens having a clear viewing zone with a region convenient for daily use in each of the far, intermediate and near (vision viewing) zones with concentration of abberation reduced in the peripheral regions.

Another object of the invention is to provide an improved ophthalmic lens having a progressively variable focal power wherein the width of the center region of the far viewing zone is at least 30 mm.

A further object of the invention is to provide an improved ophthalmic lens having a progressively variable focal power wherein the skew distortion in the outer regions of the intermediate viewing zone falls within the range of about 0.0003 to 0.0020 for lenses having a range of from one to three diopter power addition.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The ophthalmic lenses in accordance with the invention have progressively variable focal power and include a clear viewing zone of a size convient for daily use in each of the far, intermediate and near (vision viewing) zones with concentration of abberation reduced in the peripheral regions of the lenses. The far zone is horizontally divided into three regions. The center region is a clear viewing zone wherein astigmatism is within 0.5 diopters. In the regions on both sides of the center region, astigmatism is made to be greater than 0.5 diopters. As a result of this, astigmatism and distortion are reduced in the outside region of each of the intermediate zones and in the near zone. The width of the central area is also greater than 30 mm. This value of 30 mm substantially corresponds to the region of rotating the eyes an angle of 30° which is most frequently used. The specific features of the lenses in accordance with the invention will be described in connection with the accompanying drawings.

Figure 1:
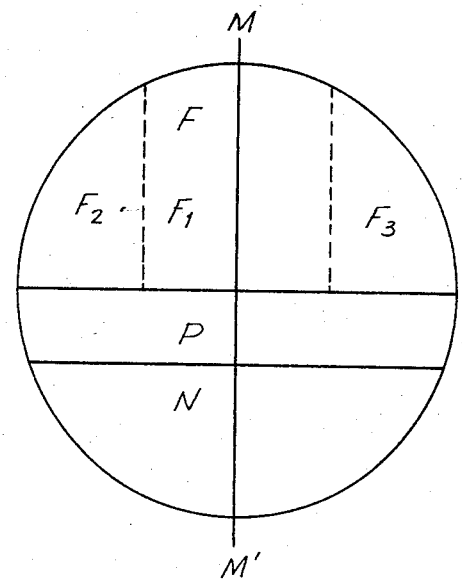
FIG. 1 is a front elevational view of a progressive power ophthalmic lens in accordance with the invention.

As shown in FIG. 1, an ophthalmic lens in accordance with the invention has the principal meridian MM' in substantially the center of the lens in the vertical direction. Along the principal meridian MM' there is a far zone F, an intermediate zone P and a near zone N viewing the lens from the upper portion to the lower portion. The boundries of each of the viewing zones are successively connected. The far zone F is divided horizontally into three areas, specifically, a first central area $F_1$ having the principal meridian MM' substantially in the center, a second outer area $F_2$ and a third outer area $F_3$, the outer areas $F_2$ and $F_3$ being disposed on both sides of central area $F_1$.

The curvature of the principal meridian MM' progressively changes in intermediate zone P to give a predetermined power addition. The form of the change of the curvature can be represented as a straight, a cubic curve or other arbitrary forms.

In order to make a lens having the smallest astigmatism along the principal meridian MM', the entire line of the principal meridian MM' from the far zone F to the near zone N should be made up of umbilical points. A umbilical point is a point wherein the curvature radii in the direction of the main curvature radii are the same as in the case of the spheric surface.

In the lower portion of central area $F_1$ of the far zone F, the line of intersection between a plane orthogonal to the principal meridian MM' and the refractive surface of the lens is represented as a non-circular curve. The curvature radius of the non-circular curve decreases along the line of intersection at points more distant from the point of intersection with the principal meridian MM'. In any event, the degree of non-circularity is relatively small, as almost the entire region of central area $F_1$ is a clear viewing zone.

The curvature radius along the principal meridian MM' in the far zone F is larger than the curvature radius in the near zone N. Thus, if the lines of intersection in both far zone F and near zone N are circular, the difference in power becomes gradually larger at a point moving from the point of intersection. For this reason, the above-mentioned non-circular curve is adopted in order to make the difference small and to provide for a smooth optical blending from the far zone F to the near zone N through the intermediate zone P. As a result of this, astigmatism and distortion in the connecting regions between adjacent zones can be reduced.

The line of intersection in the central area $F_1$ of the far zone F loses its non-circularity at the upper portion of the principal meridian MM'. In other words, the line of intersection is almost circular and becomes substantially circular at a particular position. Once it becomes circular, it remains circular. Thus, in the upper portion of the far zone F, the form of the line of intersection becomes circular and thus, the astigmatism becomes very small in a wide clear viewing zone for far vision can be obtained. This is very convenient because a wearer usually casts an upward glance when looking at a far object and this time a wide clear viewing zone is required in the upper portion of the far zone F.

The two outer areas $F_2$ and $F_3$ on either side of far zone F are rarely used when lenses designed in accordance with this invention are worn as glasses. Accordingly, in these areas $F_2$ and $F_3$, no unfavorable effect occurs on the wearer even if a somewhat large abberation occurs. Thus, the lines of intersection in these outer areas $F_2$ and $F_3$ are little different from the curve in the central area $F_1$. By utilizing this structure, abberations in the near zone N and in the intermediate zone P (especially at the side regions of each of the zones) are reduced and concentration of abberation in a particular region of the lens surface is avoided.

In the near zone N, the line of intersection between a plane orthogonal to the principal meridian MM' and the refractive surface of the lens is a non-circular curve. The value of the curvature radius increases initially and thereafter decreases on the line of intersection at points more distant from the point of intersection with the principal meridian MM'. The value of the curvature radius initially increases for the purpose of blending the far zone F and the near zone N smoothly. In this case, it is necessary that the increasing rate of curvature should be increased somewhat in order to provide clear viewing zone which is wide enough for use. If the increasing rate is not increased fast enough, abberation becomes too large when moving towards the side regions of the lens. The increasing rate should be decreased at a certain point. At this point, distortion on the side of the near zone N can be relatively small and the shaking phenomenon of the image will not be felt by a wearer. Additionally, the astigmatism can also be reduced.

In the intermediate zone P, as the line of intersection between a plane orthogonal to the principal meridian MM' and the refractive surface of the lens becomes more distant from the point of intersection with the principal meridian MM', the curvature radius decreases on the side of intermediate zone P connecting with the far zone F. On the side of the connection with the near zone N, the curvature radius increases. Thereafter, as in the case in the near zone N, the curvature radius then decreases. The rate of change of the curvature radius changes from decreasing to increasing successively between each side of the intermediate zone P at the connection with the near zone N and the far zone F. This change is not uniform. The line of intersection where the increasing rate is a maximum occurs in almost the central portion of the intermediate zone P. It is then possible to connect the far zone F and the near zone N more smoothly. Additionally, astigmatism near the principal meridian MM' decreases. As a result of this the field for intermediate vision is broadened.

Plastic ophthalmic lenses made of CR-39 having zero-dioptic distance power and 2-dioptic power addition will be described as an embodiment in accordance with the invention. The values presented are illustrative and not intended in a limiting sense.

Figure 2:
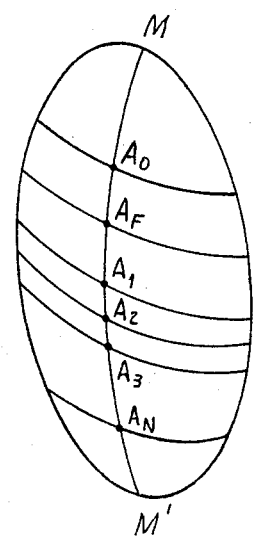
FIG. 2 is a perspective view of a progressive power ophthalmic lens in accordance with the invention.

Referring now to FIGS. 2 and 3, the values of the refractive power in each point identified in the figures is as follows:

| Point $A_1$ | $P_{W1}$ | 0 diopter |
| Point $A_2$ | $P_{W2}$ | 1.0 diopter |
| Point $A_3$ | $P_{W3}$ | 2.0 diopters |

Points $A_1$ and $A_3$ are the optical centers of the far zone F and the near zone N, respectively.

The value of the radius of curvature on the principal meridian MM' is constant in the far zone F and in the near zone N. The radius of curvature changes in accordance with a sine curve from the point $A_1$ to the point $A_3$ across the intermediate zone P. The values at the respective points are as follows:

| Point $A_1$ | 1/R1 | 0.01094 (R1 = 91.41 mm) |
| Point $A_2$ | 1/R2 | 0.01279 (R2 = 78.17 mm) |
| Point $A_3$ | 1/R3 | 0.01479 (R3 = 67.60 mm) |

Thus, there is no change in power on the principal meridian MM' in the far zone F and in the near zone N. Accordingly, acceptable field of vision can be obtained.

In the far zone F, the line of intersection between the plane orthogonal to the principal meridian MM' and the refractive surface of the lens is represented by the quadratic equation as follows:

$$y = cx^2/(1 + \sqrt{1 - kc^2x^2}). \tag{1}$$

In equation (1) k is the non-circular coefficient and c is the lens curvature (1/R). The form of the line of intersection is illustrated in FIG. 4. The curvature radius becomes smaller at a point on the line of intersection more distant from the principal meridian MM'. In FIG. 4, the dotted line illustrates the form of a circular curve. The form of the line of intersection becomes more divergent from the circle because the value of k becomes greater in the lower portion of the far zone F. For the lines of intersection in the upper portion of the far zone F, the value of k becomes smaller, and the difference from the shape of the circle is smaller in this region. In substantially the central portion of the far zone F, k approaches 1 (a circle), and k remains 1 in the upper portion. This change in the value of k is shown in FIG. 3(b).

Figure 5:
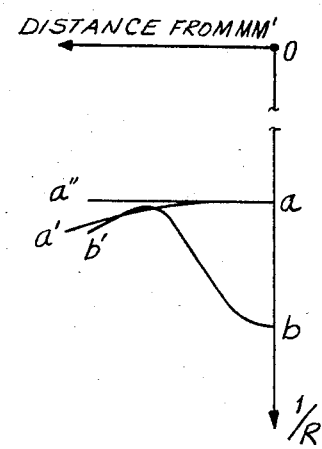
FIG. 5 illustrates the change of curvature along the line of intersection passing through points $A_O$, $A_F$ and $A_N$ as illustrated in FIG. 2.

The curvature of the line of intersection of the plane passing through point $A_F$ corresponds to curve a-a' shown in FIG. 5. The curvature of all the lines of intersection above the line of intersection of the plane passing through point $A_0$ corresponds to the line a-a''. In both cases, only one-half of the curve of the lines of intersection are shown. In this embodiment, the width of the central region $F_1$ is about 40 mm.

The curvature of the lines of intersection in each of the near zone N and the intermediate zone P are not as simple as the far zone F described above. The curvature is a special curve which includes a term of higher degree. The curve is similar to the quadratic curve when it approaches the principal meridian MM' or about 10 mm to one side of the principal meridian. The change in the value of k as it approaches intermediate zone P and near zone N is shown in FIG. 3(b).

Figure 3A:
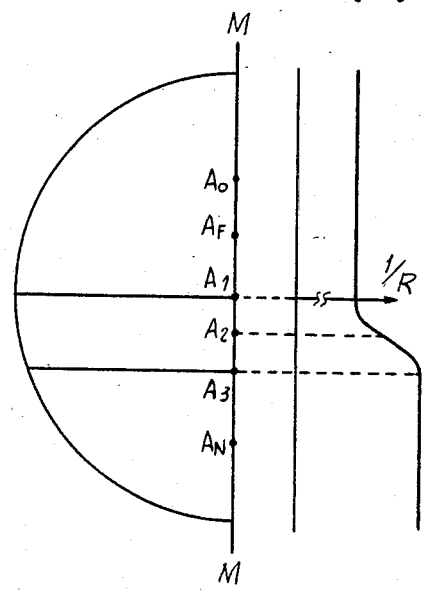
FIG. 3(a) is a front elevational view of a portion of a progressive power ophthalmic lens and showing of curvature change along the principal meridian of the lens in accordance with the invention.
Figure 3B:
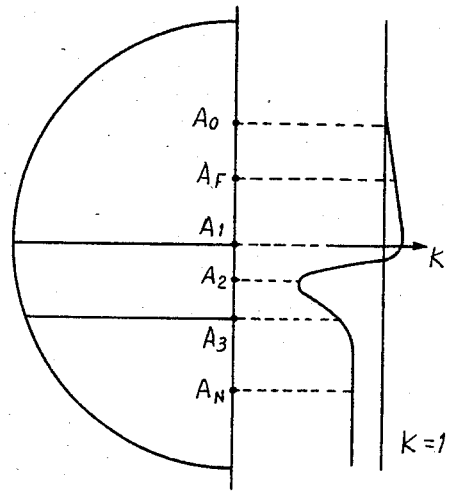
FIG. 3(b) is a front elevational view of a portion of a progressive power ophthalmic lens and representation of the change of the value of K (non-circular coefficient) in the case where the line of intersection between the refractive surface and a plane orthogonal to the principal meridian of the lens is represented as a quadratic curve.
Figure 4:
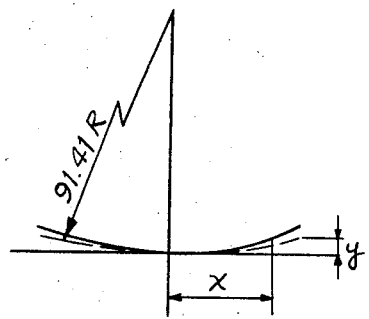
FIG. 4 illustrates the shape of the line of intersection between the refractive surface and the plane orthogonal to the principal meridian of the lens in the far vision viewing zone of a progressive power ophthalmic lens in accordance with the invention.

Referring now to FIGS. 3(a) and 3(b), the curvature and the value of k for the lines of intersection of the plane orthogonal to the principal meridian MM' is shown. In the near zone N, the curvature and value of k do not change much and are almost constant except in the portion at the connection with the intermediate zone P. The width of the clear viewing zone for the near zone N is also almost constant. The change of the curvature on the line of intersection passing through point $A_N$ is represented as the curve b-b' illustrated in FIG. 5.

The far zone F and the near zone N are connected through the intermediate zone P wherein the value of k is a minimum in substantially the central portion of the intermediate zone P or somewhat towards the near zone N as illustrated in FIG. 3(b). The value of k in the far zone F and in the near zone N changes gradually when compared with the value of k in the intermediate zone P so that both distortion and astigmatism are improved for this design.

Figure 6:
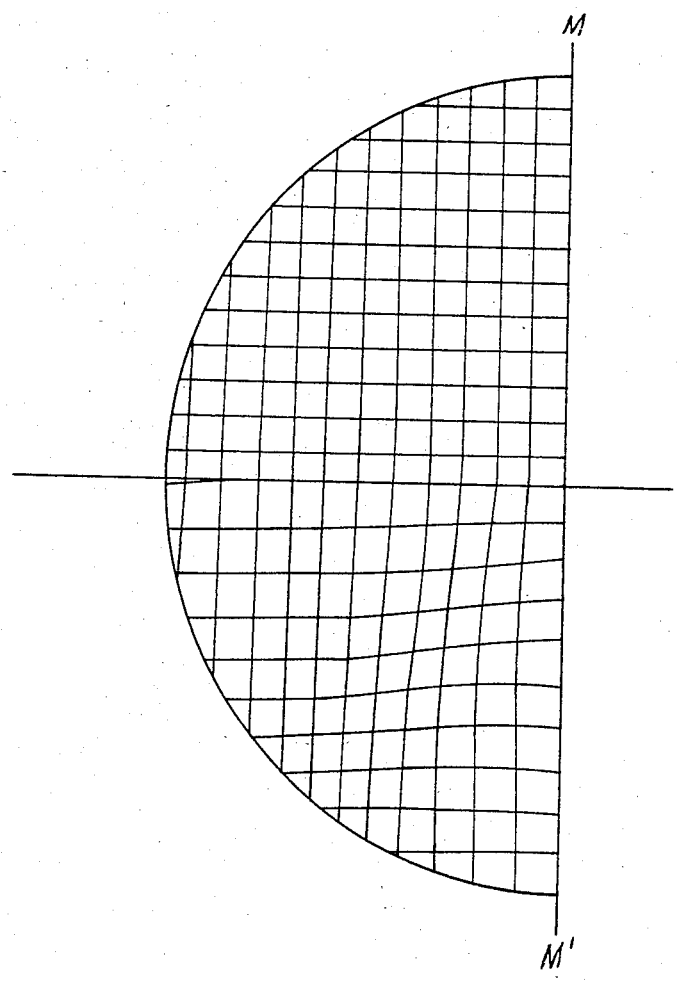
FIG. 6 is an illustration of the distortion of a square grid when viewed through a progressive power ophthalmic lens in accordance with the invention.

Referring now to FIG. 6, the distortion caused when viewing a square grid through a lens in accordance with this embodiment of the invention is shown. As the upper half of the far zone F is substantially a spherical surface, no distortion is found. Thus, the square grid view to the lens remains as it is and its size is also the same. In the lower portion, of the far zone F as noted above, the form of the line of intersection between a plane orthogonal to the principal meridian MM' and the refractive surface of the lens is an aspheric curve so that the curvature radius decreases at points along the line of intersection moving from the principal meridian MM'. This phenomenon is shown in FIG. 6 wherein the intervals between vertical lines of the grid are broadened to some degree.

In the near zone N, there is a region where the square grid appears to be larger than its true size and remains substantially square. This region substantially corresponds to the clear viewing zone of the near zone N. In the same manner as in the far zone F, the change of the curvature radius of the line of intersection of the plane orthogonal to the principal meridian MM' is shown as the change of the intervals between vertical lines of the grid.

The intermediate outer region of the lens almost midway between the principal meridian MM' and the edge portion of the lens, vertical lines of the square grid are seen as nearly straight lines, but not quite vertical with a slight incline away from the principal meridian MM' as one moves downward in the lens. This is due to the fact that the value of k (the non-circular coeffecient) changes from the far zone F. Also, in the intermediate zone P and in the near zone N, inclination of the vertical lines are not changed as the skew distortion remains a little. Vertical lines of the grid are almost vertical, but incline slightly. The shaking phenomenon felt when the face or eyes of the wearer are moved is less in the case when such lines appear to be straight than in the case where they appear to be refracted suddenly. In addition, the concentration of astigmatism is small so that little blur is observed and glasses including lenses in accordance with this embodiment of the invention become easy to use.

As far as the shaking phenomenon is occurred, it is the same with respect to the horizontal line of the grid. In the outer region of the near zone N and the intermediate zone P, the horizontal lines of the grid are substantially horizontal, but they appear to be lower at points more distant from the principal meridian MM'. In this case, the amount of refraction is reduced and the change is smooth. As a result, the shaking phenomenon is barely observed. On the whole the grid which is seen through this lens in accordance with this embodiment of the invention, has no region where there is a sudden change and the shaking phenomenon felt by the wearer is small.

The value of the skew distortion in a lens prepared in accordance with this embodiment of the invention is as follows. The skew distortion is expressed as $\partial^2 f/\partial x \partial y$. In this case, $z=f(x,y)$. x and y are distances in the horizontal and vertical directions, respectively, from the geometrical center (the optical center in the far zone F in this embodiment) and the origin and z is the distance of the refractive surface of the lens from the plane x-y. When the skew distortion is 0, $\partial^2 f/\partial x \partial y = 0$. However, in a lens having 2-diopter power addition in accordance with this embodiment of the invention, the value of the skew distortion $\partial^2 f/\partial x \partial y$ is between 0.0007 to 0.0016 in the side area of the intermediate zone P. This value increases in cases that the power addition is larger. Accordingly, in lenses having a progressively variable focal power in accordance with this embodiment of the invention with between 1 to 3-diopter power addition, the value of the skew distortion $\partial^2 f/\partial x \partial y$ is in the range of between 0.0003 to 0.0020.

The lenses prepared in accordance with this embodiment of the invention have such a value for the skew distortion, because a special non-circular curve is adopted in the intermediate zone P. Such a value for the skew distortion remains a little in order to obtain the above-mentioned effects keeping in mind the overall balance of the abberation of the lens.

Figure 7:
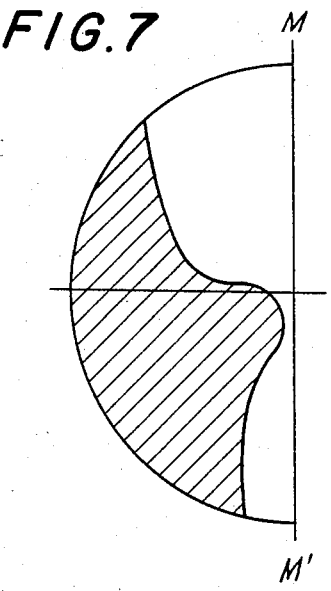
FIG. 7 is a front elevational view of a portion of a progressive power ophthalmic lens illustrating the clear viewing zone in accordance with the invention.

The clear viewing zone in each of the far zone F, near zone N and the intermediate zone P is as shown in FIG. 7. Such a clear viewing zone is broad enough for every day use when ophthalmic lenses in accordance with this embodiment of the invention are included in eye glasses. This is especially true in the far vision viewing zone F wherein the clear viewing zone represents the usual rotating angle of the eyes. Also referring to FIG. 7, the shaded portion of the lens is the region where the astigmatism is comparatively large, and the value of the astigmatism is larger in the outer area. It should be noted that the value of the astigmatism does not increase rapidly, but increases slowly.

Thus, in the ophthalmic lenses prepared in accordance with this embodiment of the invention, the clear viewing zone for the far vision viewing zone F through which it is necessary to see a broad range is very wide. In contrast, the clear viewing zone of the near vision viewing N and the intermediate vision viewing zone P are narrower, but include sufficient width which will not inconvenience a wearer in usual daily use. As the astigmatism in the lens is dispersed so as not to concentrate in a particular region and in combination with the fact that the clear viewing zone is shaped as noted above, the ophthalmic lenses having a progressively variable focal power provide a design which most suitable for the every day general use of wearer of eye glasses.

When progressively variable focal power ophthalmic lenses prepared in accordance with the invention are placed into actual use in eye glasses, the principal meridian MM' of the lens is rotated about the central point $A_1$ of the lense to compensate for the decreasing interpupilary spacing at near vision. In other words, the distance between points $A_3$ is reduced. This is due to the fact that the distance between the pupils of a wearer eyes becomes smaller when the wearer looks at an object in the near vision viewing zone N.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. An ophthalmic lens comprising a lens body having:
a principal meridian in a substantially vertical direction and substantially in the center of the lens body;
a far vision viewing zone in the lower portion of the lens body;
a near vision viewing zone in the lower portion of the lens body;
an intermediate vision viewing zone disposed between the upper far vision viewing zone and the lower near vision viewing zone, the refractive power of the lens in the intermediate zone progressively increasing from the upper portion to the lower portion; and
the line of intersection between the refractive surface of the lens body and the plane orthogonal to the principal meridian in the lower portion of the far vision viewing zone being a non-circular curve having a curvature radius decreasing along the line of intersection as the distance from the principal meridian increases, the decreasing rate of the value of the curvature radius decreasing down to zero wherein the surface becomes spherical at the upper portion of the far vision viewing zone and thereafter remains constant;
wherein said far vision viewing zone is horizontally divided into three regions with the center region with the astigmatism within 0.5 diopters and astigmatism being greater than 0.5 diopters in the outer regions to each side of said central region, said central region having the principal meridian substantially passing through the center thereof.

2. The ophthalmic lens of claim 1, wherein the width of the central region of the far vision viewing zone is at least more than 30 mm.

3. The ophthalmic lens of claim 1 or 2, wherein the skew distortion $\partial^2 f/\partial x \partial y$ wherein $z=f(x,y)$ and x and y are the distances in the horizontal and vertical directions, respectively, from the geometrical center (the optical center in the far zone) and the origin and z is the distance of the refractive surface of the lens from plane x-y in the side area of the intermediate vision viewing zone is within the range of about 0.0003 to 0.0020 for a lens having one to three-diopter power addition.

4. The ophthalmic lens of claims 1 or 2, wherein the skew distortion $\partial^2 f/\partial x \partial y$ wherein $z=f(x,y)$ and x and y are the distances in the horizontal and vertical directions, respectively, from the geometrical center (the optical center in the far zone) and the origin and z is the distance of the refractive surface of the lens from plane x-y in the side regions of the intermediate vision viewing zone is within the range of about 0.0007 to 0.0016 for a lens having a 1 to 2-diopter power addition.

5. An ophthalmic lens comprising a lens body having:
a principal meridian substantially in the center of the lens body in a vertical direction, a far vision viewing zone in the upper portion of the lens body, a near vision viewing zone in the lower portion of the lens body, and an intermediate vision viewing zone disposed between the upper far vision viewing zone and the lower near vision viewing zone, the refractive power on the surface of the lens body in the intermediate vision viewing zone progressively increases from the upper portion to the lower portion of the intermediate vision viewing zone,
the line of intersection between the refractive surface of the lens body and on the plane orthogonal to the principal meridian in the lower portion of the far vision viewing zone being a non-circular curve having a curvature radius decreasing along the line of intersection as the distance from the principal meridian increases, the decreasing rate of the value of the curvature radius decreasing down to zero wherein the surface becomes spherical at the upper portion of the far vision viewing zone and thereafter remains constant;
the line of intersection between the refractive surface of the lens body and a plane orthogonal to the principal meridian in the near vision viewing zone having a curvature radius which increases as the distance from the principal meridian increases and thereafter decreases, the increasing rate of the curvature radius remaining substantially constant except for the region immediately adjacent to the border to said intermediate vision viewing zone;
the line of intersection between the refractive surface of the lens body and a plane orthogonal to the principal meridian in the intermediate vision viewing zone being a non-circular curve having a curvature radius increasing as the distance along the line of intersection from the principal meridian increases, except in the region immediately adjacent to the border between the intermediate vision viewing zone and the far vision viewing zone, the increasing rate of the curvature radius being a maximum in substantially the central portion of the intermediate vision viewing zone; and
the entire length of the principal meridian being umbilical and in the intermediate vision viewing zone the principal meridian having a change of curvature for providing a predetermined power addition which increases generally from the upper far vision viewing zone towards the lower near vision viewing zone.

6. The ophthalmic lens of claim 5, wherein the skew distortion $\partial^2 f/\partial x \partial y$ wherein $z=f(x,y)$ and x and y are the distances in the horizontal and vertical directions, respectively, from the geometrical center (the optical center in the far zone) and the origin and z is the distance of the refractive surface of the lens from plane x-y in the side regions of the intermediate vision viewing zone is between about 0.0003 to 0.0020 when the lens has a power addition from 1 to 3-diopters.

7. The ophthalmic lens of claim 5, wherein the skew distortion $\partial^2 f/\partial x \partial y$ wherein $z=f(x,y)$ and x and y are the distances in the horizontal and vertical directions, respectively, from the geometrical center (the optical center in the far zone) and the origin and z is the distance of the refractive surface of the lens from plane x-y in the side region of the intermediate vision viewing zone is between about 0.0007 to 0.0016 for a lens having a power addition of from 1 to 2-diopters.

8. The ophthalmic lens of claim 5, wherein the far vision viewing zone is horizontally divided into three regions, a central region having the principal meridian passing through the central portion thereof and two outer regions, the astigmatism being the smallest in the center region and the astigmatism increasing in the regions on the opposed outer sides of the center region.

9. The ophthalmic lens of claim 8, wherein the astigmatism in the center region of the far vision viewing zone is within 0.5 diopters and the astigmatism in the side regions is greater than 0.5 diopters.

10. The ophthalmic lens of claim 9, wherein the width of the central region of the far vision viewing zone is at least 30 mm.

* * * * *